Nov. 15, 1949     F. L. RUPLEY     2,488,037
PNEUMATICALLY OPERATED WEIGHER AND ASSORTER
Filed May 5, 1947     5 Sheets-Sheet 1
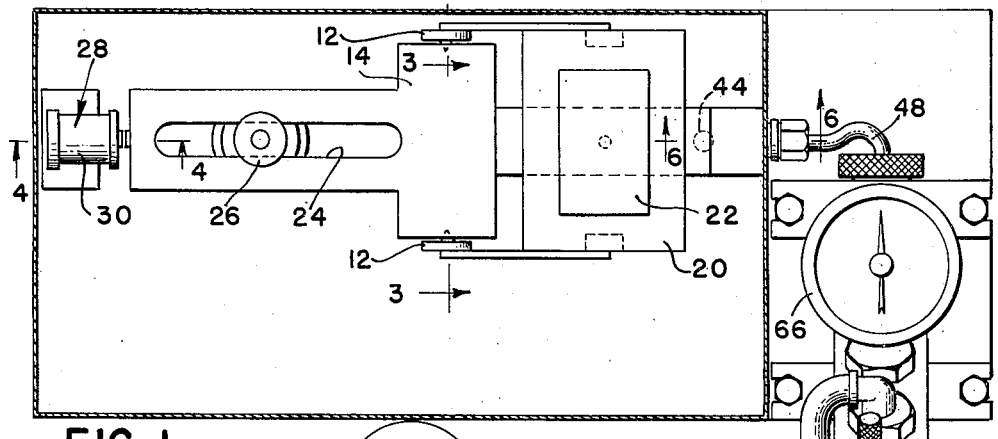
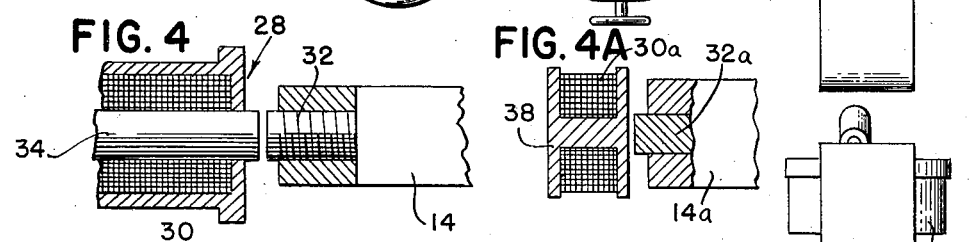
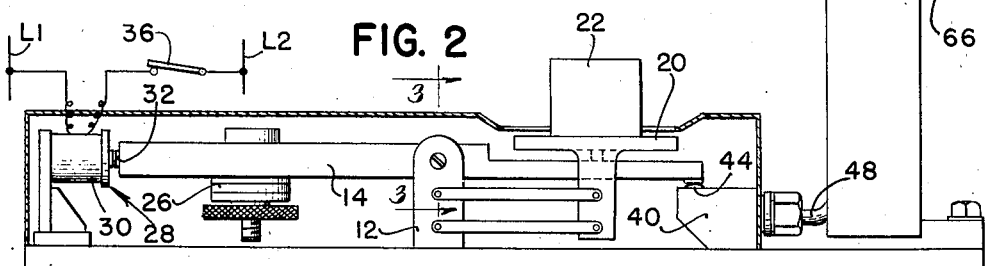
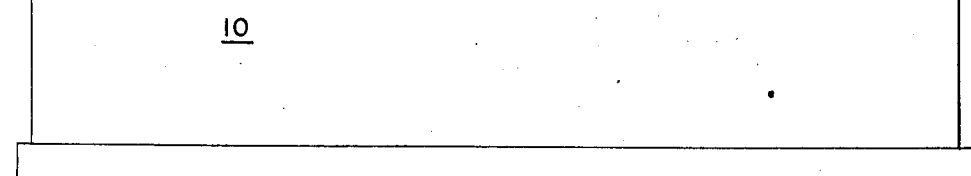
INVENTOR
FREDERICK L. RUPLEY
BY
Toulmin & Toulmin
ATTORNEYS Nov. 15, 1949   F. L. RUPLEY   2,488,037
PNEUMATICALLY OPERATED WEIGHER AND ASSORTER
Filed May 5, 1947   5 Sheets-Sheet 2
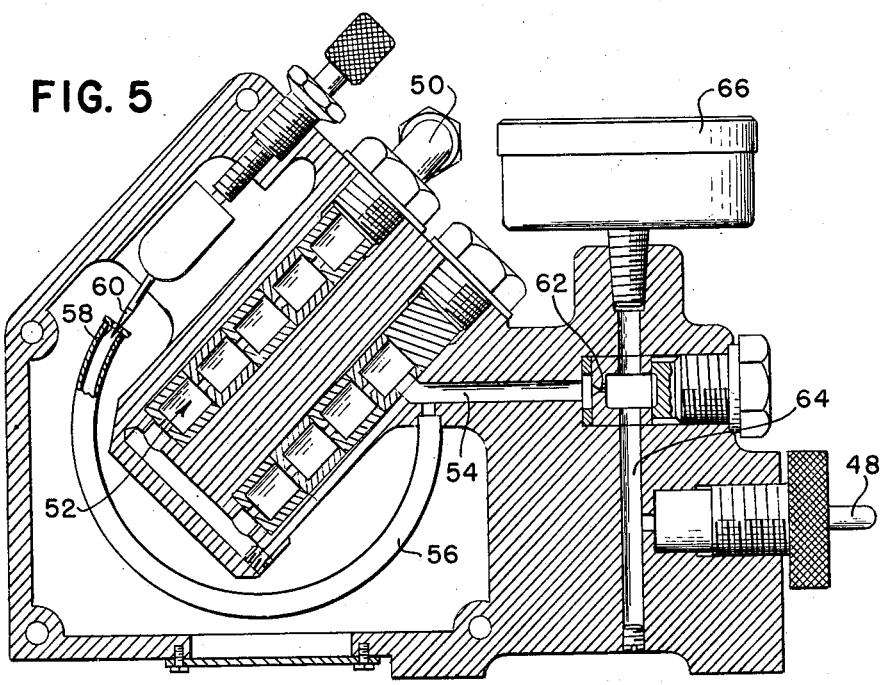
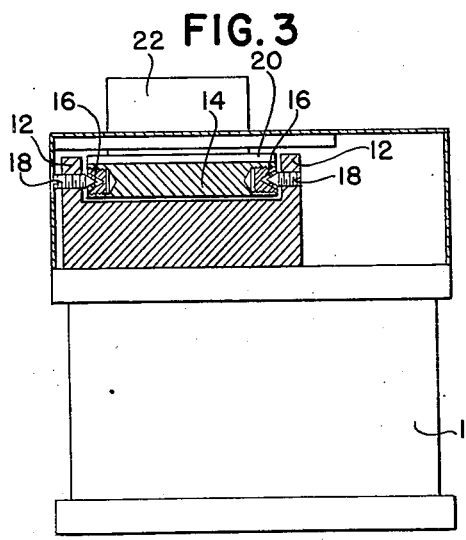
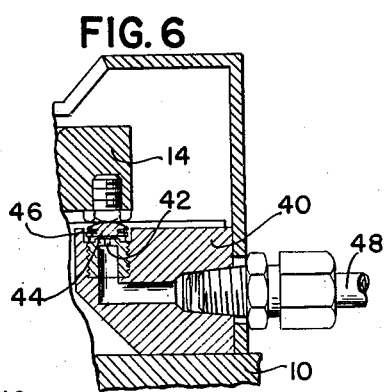
INVENTOR
FREDERICK L. RUPLEY
BY
Toulmin & Toulmin
ATTORNEYS Nov. 15, 1949     F. L. RUPLEY     2,488,037
PNEUMATICALLY OPERATED WEIGHER AND ASSORTER
Filed May 5, 1947     5 Sheets-Sheet 3

INVENTOR
FREDERICK L. RUPLEY
BY
Toulmin & Toulmin
ATTORNEYS

Nov. 15, 1949     F. L. RUPLEY     2,488,037
PNEUMATICALLY OPERATED WEIGHER AND ASSORTER
Filed May 5, 1947     5 Sheets-Sheet 4
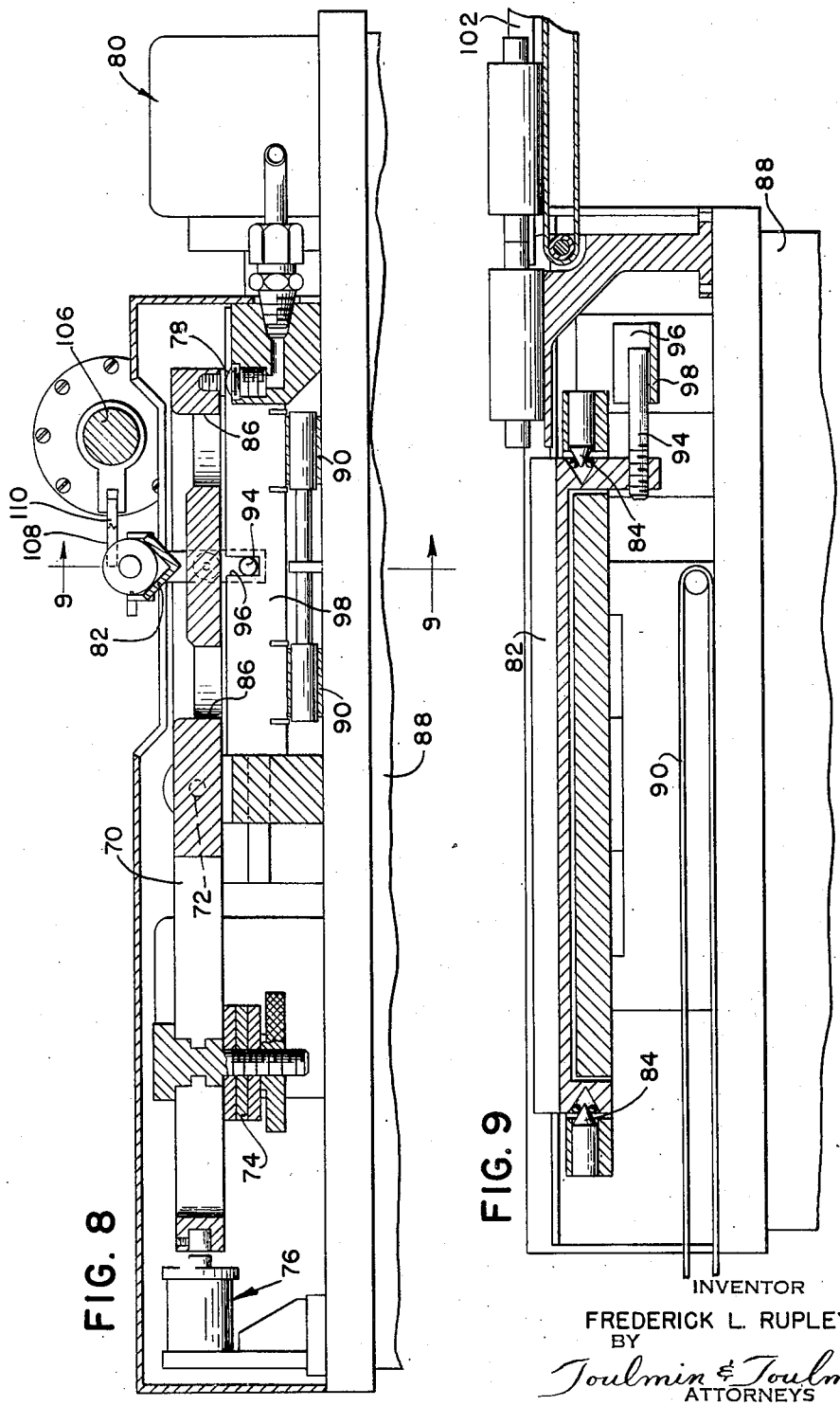
INVENTOR
FREDERICK L. RUPLEY
BY
Toulmin & Toulmin
ATTORNEYS

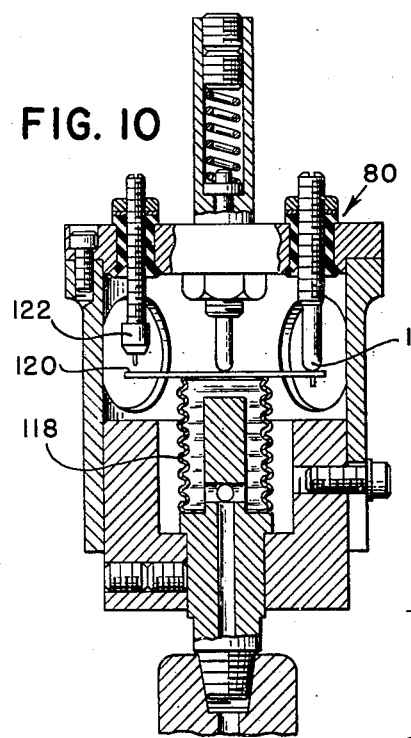
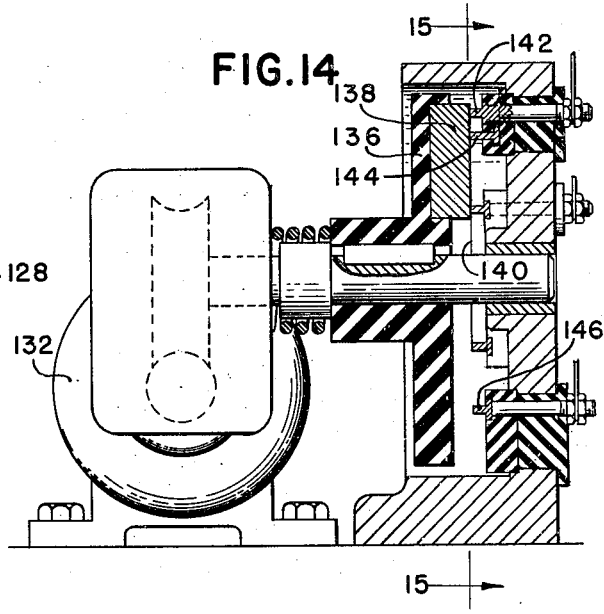
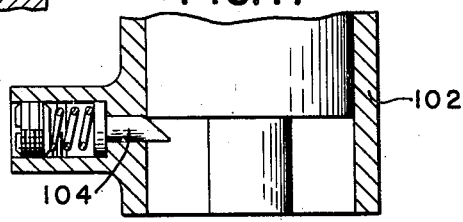
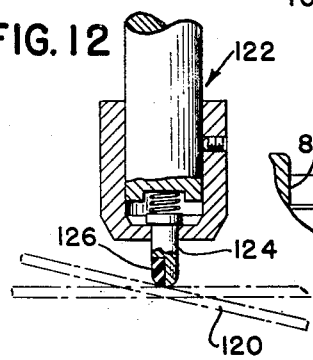
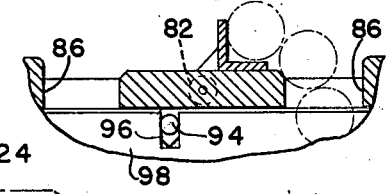
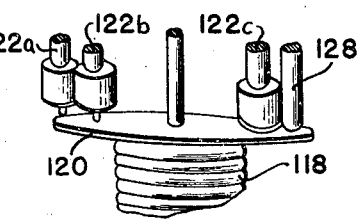

Patented Nov. 15, 1949

2,488,037

UNITED STATES PATENT OFFICE 2,488,037

PNEUMATICALLY OPERATED WEIGHER AND ASSORTER

Frederick L. Rupley, Cincinnati, Ohio, assignor to Merz Engineering Company, Indianapolis, Ind., a corporation of Indiana Application May 5, 1947, Serial No. 746,041

7 Claims. (Cl. 209—121)

This invention relates to scales and weighing devices and particularly to such devices in combination with a pneumatically operated detector or indicating device.

The particular object of the present invention is to provide a weighing device or scale mechanism which is highly accurate. Still another object is the provision of a weighing device which can readily be adjusted for different ranges of weights.

Another object of this invention is to provide a weighing device especially adapted for being automatically controlled for use as a production weighing mechanism. It is also an object of this invention to provide in combination with a weighing mechanism, mechanism for automatically sorting the work pieces weighed in accordance with the exact weight thereof.

These and other objects and advantages will become more apparent upon reference to the following description taken in connection with the accompanying drawings in which:

Figure 1 is a plan view of a weighing device or scale constructed according to this invention;

Figure 2 is a side view thereof partly in section;

Figure 3 is a transverse section indicated by the line 3—3 on 1;

Figure 4 is a section on the line 4—4 of Figure 1 and shows the means for locking the scale beam when not in use;

Figure 4A is a similar view showing another form of locking device;

Figure 5 is a sectional view through the pneumatic indicating mechanism controlled by movements of the scale beam;

Figure 6 is an enlarged detail showing the port which is pneumatically connected with the indicating mechanism and which is varied by movements of the scale beam;

Figure 8 is a transverse section indicated by the line 8—8 on Figure 7;

Figure 9 is a sectional view indicated by a line 9—9 on Figure 8;

Figure 10 is a sectional view through the electric switch which is controlled by variations in pressure in the pneumatically operated device associated with the weighing mechanism of Figure 7;

Figure 11 is a perspective view showing the arrangement of contacts in the switch of Figure 10;

Figure 12 is a detailed view showing one of the contact points of the switch contacts;

Figures 14 and 15 are sectional views through a cycling switch connected to control the operation of the weighing and sorting mechanism of Figure 7;

Figure 16 is a fragmentary sectional view showing how the weighed work pieces are delivered from the scale after being weighed; and Figure 17 is a fragmentary sectional view showing the detent mechanism which retains the supply of work pieces to be weighed ahead of the weighing mechanism.

General arrangement

Figure 13:
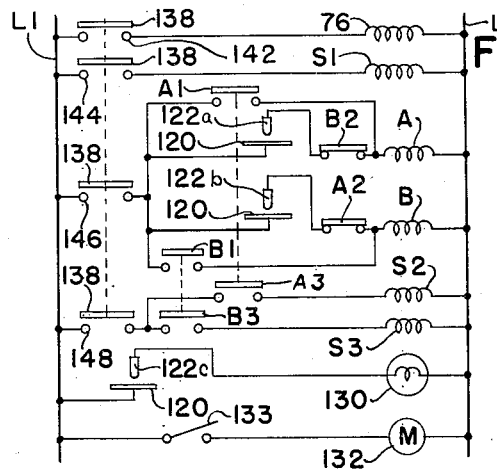
Figure 13 is a diagrammatical view of the electric circuit associated with the weighing and sorting device of Figure 7.

A scale constructed according to this invention comprises a pivoted beam having a counterweight adjustably mounted on one side of the pivot axis thereof and a weighing platform on the other side of the said axis. The end of the beam adjacent the weighing platform is arranged to vary a port as it moves due to the weight of the articles placed thereon. The aforementioned port is connected in series with a pneumatically operated indicating mechanism which is fully disclosed and described in my co-pending application, Serial #653,353, filed March 9, 1946.

When a work member is placed on the weighing platform, the scale beam tilts and adjusts the port and an indication of the weight of the object being weighed is given by the pneumatically operated indicating mechanism. For retaining the scale beam in a neutral position while it is being loaded or unloaded, the end of the said beam at the counterweight side has a magnetically operated centering device which may be selectively energized to hold the beam in its neutral position or de-energized to permit free movement of the beam for a weighing operation.

A preferred modification of this invention is that wherein an automatic weighing and sorting cycle is accomplished. In this modification, the work pieces are fed singly and automatically from a supply means to a weighing platform. When the work pieces have been weighed by the scale mechanism, they are delivered therefrom to one of a plurality of receiving stations in accordance with the measured weight thereof. The weight of the work pieces is employed, as in the first modification, for varying a port of a pneumatically operated instrument. Variations in pressure in the instrument as brought about by variations in the said port are employed for actuating a pressure operated multi-contact electric switch. The switch, in turn, is employed for controlling the mechanism which delivers the work piece from the weighing device to one of the aforementioned receiving stations.

In order to provide for a full automatic cycle there is a cycle switch which controls the feeding of the work pieces on to the weighing mechanism, the energization and de-energization of the scale beam locking device, and the controlling of the distributing mechanism for delivering the work pieces to the receiving stations by the electric switch.

*Structural arrangement of the embodiment of Figures 1 through 6*

Referring more particularly to the drawings, and especially to Figures 1 through 6, there is shown a scale mechanism therein constructed according to this invention and adapted for manual operation. The scale comprises a frame or bed member 10 which has mounted thereon the outstanding members 12 between which the scale beam 14 is pivotally carried. This pivotal support is best seen in Figure 3 wherein it will be seen that there are the anti-friction bearings 16 carried by the beams 14 and the cone pointed screws 18 carried by the members 12.

The scale beam 14 at the one side of the said pivot axis comprises a weighing platform 20 which is adapted for receiving work pieces 22 which are to be weighed. The other end of the scale beam is slotted as at 24 and adjustably receives the counterweight 26. By varying the counterweight in sizes and position the scale beam can be adapted to a wide range of weights.

At the extreme end of the beam 14 on the counterweight side thereof there is a locking mechanism 28 which comprises, as best seen in Figure 4 an electromagnet 30 stationarily mounted on the bed 10 and a magnetic member 32 carried in the end of the scale beam. As shown in Figure 4, the coil 30 may have a core 34 therein of magnetic material so that upon energization of the coil 30, the members 32 and 34 are attracted to each other and hold the beam 14 in a neutral position. Energization of the coil 30 may be controlled by a switch 36 which is connected in series with the coil between the power lines L—1 and L—2 as seen in Figure 2.

Preferably, the beam 14 is of non-magnetic material such as aluminum to provide for a better locking action by the device 28.

In Figure 4A there is shown a modified arrangement wherein the coil 30—a is wound on a non-magnetic support 38 and wherein the magnetic member 32—a carried in the end of the beam 14—a is a special alloy such as any of the several recently developed Alnico alloys which are characterized by an exceedingly high permeability and magnetic strength. By the arrangement shown in Figure 4A the beam 14a is under no bias from the locking device when the coil 30a is de-energized.

At the right end of the beam 14 there is positioned a block 40 having therein a port 42 opening into the atmosphere, and supported adjacent the port 42 is a button 44 which is adapted for varying the effective area of the port 42 when moved relative thereto. The button 44 is positioned beneath the end of the beam 14 so that movements of the beam will be accompanied by corresponding movements of the button 44. A spring 46 continuously urges the button 44 away from the port 42 and maintains it in good contact with the beam 14.

The port 42 is connected by the conduit 48 with the pneumatically operated device shown in Figure 5. This device receives a supply of pneumatic fluid such as air at a controlled pressure from a conduit 50. This fluid then passes through a plurality of serially and alternately arranged restrictions and expansion chambers indicated generally at 52.

In Figure 5, the discharge end of the aforementioned series of restricters opens into a chamber 54 to which is connected the open end of a Bourdon tube 56. This tube has a port 58 in its free end which is restricted by the tapered pin 60 in inverse proportion to the pressure standing within the said tube. This operates to maintain the pressure in the chamber 54 exactly uniform at all times.

The chamber 54 also opens through an accurately sized orifice 62 into a passage 64 which connects at one end with the conduit 48 and at its other end with the pressure responsive indicating instrument 66. The instrument 66 may be of any of the usual types such as a Bourdon tube type instrument and is adjusted to be responsive to the pressures encountered in the passage 64.

*Operation of the embodiment of Figures 1 through 6*

In operation, the scale of this embodiment is operated by first adjusting the counterweight 26 to the proper position by means of a standard weight which may be placed on the platform 20. Thereafter, the switch 36 is closed to energize the locking means 28. This holds the beam in the neutral position so that it may be loaded and unloaded without wide variations in the port 42 which might be harmful to the delicate indicating mechanism. After the scale has been so adjusted a work piece is placed on the platform 20 and the switch 36 is opened. With the switch 36 open the beam 14 moves to a position of balance as determined by the counterweight 26, the weight of the work piece, and the spring 46. This produces a predetermined restriction at the port 42 which is reflected in a certain indication on the indicating instrument 66.

This instrument may be graduated directly in weights, but is preferably adapted for indicating pre-determined variations in the weight of the work piece from the weight of the standard. After the work piece has been weighed the switch 36 is again closed to lock the beam and a new weighing operation may be carried out.

*Structural arrangement of modification of Figures 7 through 17*

This modification employs the basic weighing mechanism of the first modification but is equipped with the necessary automatic devices to provide for a full automatic weighing and sorting machine.

Referring to the drawings, the scale beam is shown at 70 and is pivoted on the opposed pivot pins 72. The beam is counterweighted by the adjustable counterweight 74 and has associated with the counterweighted end the electromagnetically operated locking mechanism 76.

The opposite end of the beam, as best seen in Figure 8, is adapted for varying the port 78 which is connected in circuit with a pneumatic device generally indicated at 80 and which is substantially identical with the pneumatic device already explained with the first modification of this invention.

Figure 7:
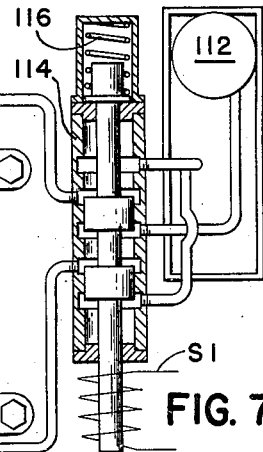
Figure 7 is a plan view partly in section of a modified arrangement of the scale mechanism adapted for operating on an automatic weighing and sorting cycle.

The weighing platform carried on the beam 70 consists of a trough like member 82 which is pivoted on the said beam as at 84, best seen in Figure 9. On each side of the trough 82 the beam is apertured as at 86 and beneath the said apertures and extending immediately over the bed 88 of the scale are a pair of conveyor belts 90. As will be seen hereinafter the trough 82 is adapted for tilting in one direction or the other about its pivot points 84 and to deliver the work piece therein to one or the other of the conveyor belts 90. As seen in Figure 7, there is a third conveyor belt 92 in alignment with the trough 82 which is adapted for receiving work pieces which are not ejected from the trough by the tilting thereof.

The tilting of the trough is accomplished by a pin 94 carried thereby on an arm which extends below the pivot axis thereof and which engages a notch 96 in a draw bar 98 extending between the oppositely positioned solenoids S2 and S3. Centering springs 100 operate to maintain the draw bar 98 in its mid position when the solenoids are de-energized thereby to support the trough 82 in the proper position relative to the beam 70.

Work pieces are supplied to the trough 82 from a feed trough 102 which has at its end adjacent the end of trough 82 the spring pressed detent 104, best seen in Figure 17, which retains the work pieces in the said trough until forced therefrom.

For carrying the work pieces from the trough 102 to the weighing trough 82 there is a reciprocal ram 106 which carries the spaced pawls 108 and 110. These pawls are effective in only one direction of movement and pass the work-pieces freely in the other direction. The ram is reciprocated by fluid from a pump 112 which is connected through the reversing valve 114 with the said ram. The reversing valve is normally urged by the spring 116 to move the ram 106 to its retracted or Figure 7 position. Energization by a solenoid S1 is operable to shift the valve to actuate the ram 106 in its feeding direction.

When the ram is so actuated the pawl 108 moves a work piece from the feeding trough 102 to the weighing trough 82 while the pawl 110 moves any work piece which may be resting in the trough 82 off the end thereof to deliver it to the conveyor belt 92.

For controlling the tilting of the weighing trough 82, the pneumatically operated device 80 has connected with the variable port thereof the electric switch mechanism shown in Figures 10, 11 and 12. This switch mechanism is more fully shown and described in my co-pending application, Serial No. #716,496, filed Dec. 16, 1946, abandoned, and has a bellows 118 therein which is connected to receive pressure fluid from the channel of the device 80 which corresponds to the channel 64 in Figure 5.

Expansion of the bellows 118 by this pressure moves a contact plate 120 to successively engage a plurality of contact members 122. These contact members, as best seen in Figure 12 each comprise a spring urged point 124 which has set therein the electrically insulated block as at 126. Then, as the plate 120 is actuated by the expansion of the bellows 118 and the said plate tilts around the abutment 128, each of the contact members is successively engaged thereby and each is disengaged at the time of making contact with the next thereof.

The electrical circuit which is controlled by the electric switch is indicated in Figure 13. In this figure the locking coil 76, the feeding device solenoid S1, the tilting solenoids S2 and S3, a pair of circuit conditioning solenoids A and B, a glow lamp 130 and a cycle switch motor 132 are connected between the power line L1 and L2. The cycle switch motor 132 is connected to be energized by the closing of a manual switch 133.

Figure 15:
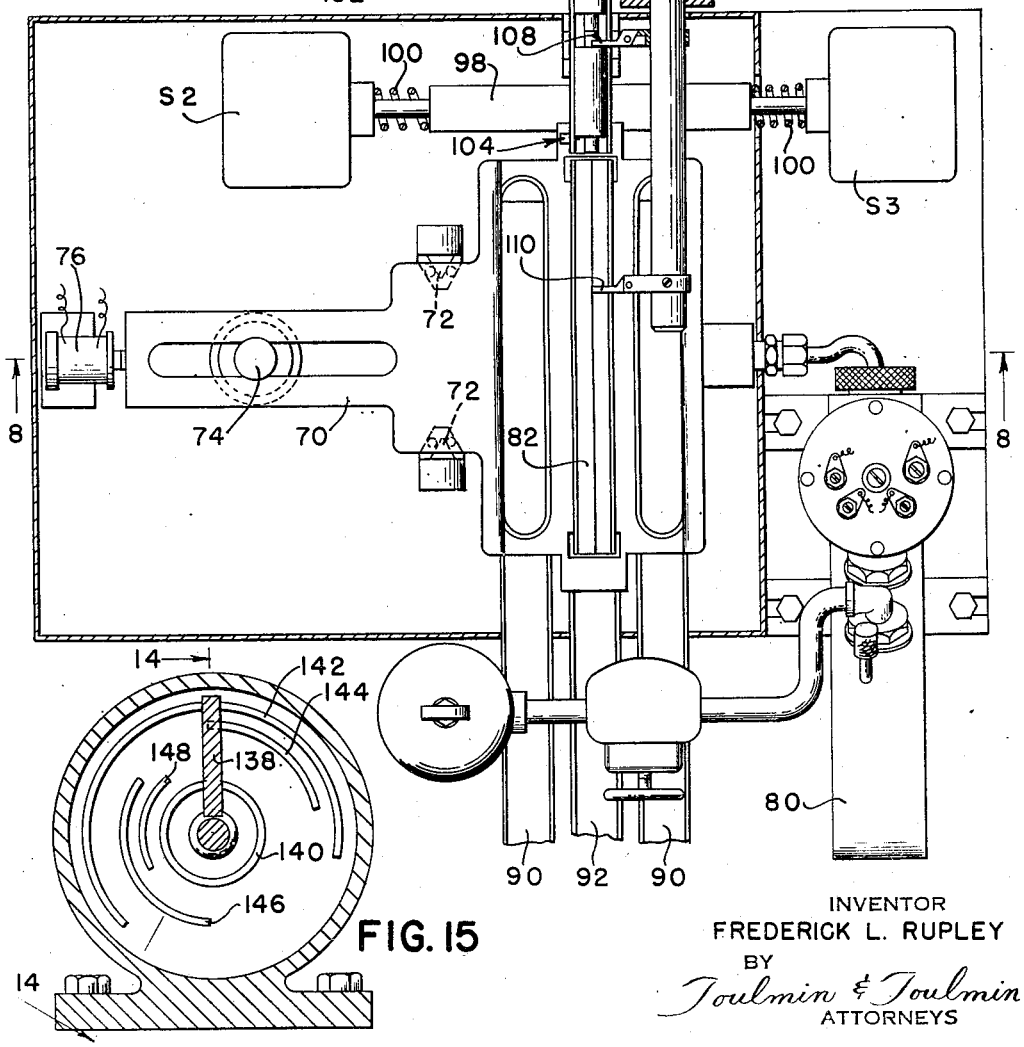

The cycle switch is better shown in Figures 14 and 15 wherein it will be seen to comprise a gear reduction unit 134 which is driven by the motor 132 and which, in turn, drives a shaft on which is mounted an arm or disc 136. The disc or arm 136 carries a contact member 138 which is continuously engaged at its inner end by a contact ring 140 connected with the power line L1. As the disc or arm 136 rotates the contact member 138 is adapted for engaging a plurality of spaced contact segments 142, 144, 146 and 148. The segment 142 is connected with the locking solenoid 76 and when engaged by the member 138 energizes the said solenoid, similarly the feeding device solenoid S1 is connected with the sector 144 and is energized when the said sector is engaged by the contact member 138.

The sector 146 is connected with the contact plate 120 of the electric switch and two of the contact members of the said switch as indicated at 122a and 122b are connected with the circuit conditioning solenoids A and B. Each of the solenoids A and B is arranged to control a normally closed contact and a pair of normally opened contacts. The normally opened contacts are positioned one to bypass the respective contact member of the electric switch and the other to prepare a circuit to one of the tilting solenoids S2, S3. The normally closed contacts controlled by the solenoids A and B are each respectively located in series with the opposite solenoids so that energization of either of the solenoids prevents energization of the other thereof.

The arrangement is such that when the contact member engages the sector 146, one of the solenoids A or B will be energized and thereby prepare a circuit for one of the tilting solenoids. This is done in order to permit the scale beam to be locked by energizing coil 76 before actuating the tilting solenoids and the feeding mechanism. Damage to the delicate indicating mechanism is thereby prevented.

As mentioned above each of the solenoids S2, S3 has in series therewith a normally opened blade controlled by one of the coils A or B. In series with this arrangement there is the contact sector 148 which, when engaged by the contact member 138, will energize one of the tilting solenoids.

The glow lamp 130 is employed for indicating the presence of a work piece on the scale beam which is to be ejected from the end of the trough 82. This lamp is connected in series with the contact member 122c and is only illuminated when the work piece is of a predetermined weight.

*Operation of the embodiment of Figures 7 through 17*

In operation, a supply of work pieces is placed in the feed trough 102, it being assumed that the scale beam has been adjusted to the proper weight range by adjustment of the counterweight 74. Thereafter, the switch 133 is closed to energize the cycle switch motor 132. When the cycle switch motor is energized, the contact member 138 driven thereby commences to move in a clockwise direction as viewed in Figure 15. This brings about the following cycle of events:

The locking coil 76 is energized to hold the scale beam substantially stationary. The solenoid S1 is energized to shift the valve 114 to actuate the feed ram 106 to deliver a work piece by the pawl 108 into the weighing trough 82. Thereafter, the contact member 138 runs off the sector 144 and de-energizes the solenoid S1 which permits the valve 114 to be shifted by the spring 116 to return the ram 106 to its retracted position. At this time the pawls 108 and 110 pass freely by the work piece permitting it to remain on the weighing trough.

Thereafter, the contact member runs off the end of the sector 42 thus de-energizing the coil 76 and unlocking the scale beam. The scale beam now assumes a position of balance which restricts the port of the pneumatic device 80, according to the weight of the work piece on the weighing trough. This actuates the electric switch to move the plate 120 thereof into contact with one of the contact members 122. After the scale beam has come to rest, the contact member 138 engages the sector 146. When the sector 146 is engaged if either of the contact members 122a or 122b are engaged by the plate 120, then the corresponding solenoid A or B will be energized.

Assuming that it is the contact member 122a which is engaged by the plate 120, then the solenoid A will be energized to close the blades A-1 and A-3 thereof and to open the blades A-2. Closing of A-1 establishes a holding circuit for A which bypasses the contact member 122a. This prevents de-energization of the coil A when the scale beam moves due to the locking thereof before the trough 82 is tilted. Opening of A-2 likewise prevents energization of B when the scale beam moves due to the locking thereof.

The closing of A—3 prepares a circuit for the tilting solenoid S2 so that when the contact member 138 engages the sector 148, the said solenoid will be energized to tilt the trough 82 toward the right as viewed in Figure 7 and to deliver the work piece thereon to the right hand conveyor belt 90. It will be noted that the member 138 engages the sector 142 before it engages the sector 148 thus locking the scale beam to prevent damage to the indicating instrument or to the electric switch mechanism during the tilting of the trough 82.

After a predetermined length of time, the contact member 138 runs off the end of the sector 148 and 146 and the trough returns to its upright position. The cycle is thereafter repeated until the switch 133 is opened to de-energize the motor 132.

Should the work piece being weighed be of such a weight that neither of the contact members 122a or 122b are engaged, then the weighing trough does not tilt and the work piece is ejected during the next cycle to the center conveyor belt 92.

It will be seen from the foregoing that this invention provides for a scale mechanism which is highly accurate and sensitive and which may be adjusted to be responsive to a wide variety of weights. Because the mechanism is so sensitive it is well adapted for use as a laboratory scale and the port to atmosphere which is varied by the scale beam may be adjusted in order to produce wide deflections of the indicating instrument for small changes in weight on the weighing platform.

The automatic weighing and sorting mechanism is adapted for use in connection with automatic packaging systems and for selective assembly work cycles and may be adjusted to sort the work pieces according to any predetermined weight differential.

It will be understood that this invention is susceptible to modification in order to adapt it to different usages and conditions, and, accordingly, it is desired to comprehend such modifications within this invention as may fall within the scope of the appended claims.

I claim:

1. In an automatic scale; a pivoted scale beam; a tiltable platform on said beam; a conveyor on each side of said platform; a fluid operable device having a port variable by movements of said beam as brought about by weights placed on said platform; a pressure operable electric switch responsive to pressures created by the variation of said port; and means for tilting said platform in one direction or the other to deliver the work pieces therefrom to one or the other of said conveyors and controlled by said switch.

2. In an automatic weighing and sorting machine; a scale beam; a platform on said beam tiltable to eject work pieces therefrom; a feeding mechanism operable to supply work to said platform and to eject work pieces therefrom which are not ejected by the tilting thereof; a fluid operable detector having a port variable by movements of said beam for creating a variable pressure; an electric switch responsive to said variable pressure; first electrical means energizable for urging said beam toward a neutral position; second electrical means energizable for actuating said feeding mechanism; third electrical means energizable for tilting said platform; means responsive to the actuation of said switch to determine the energization of said third electrical means; and a cycle switch operable to control the cycle of energization of all of said electrical means.

3. In an automatic weighing and sorting machine; a scale beam; a platform on said beam tiltable to eject work pieces therefrom; a feeding mechanism operable to supply work to said platform and to eject work pieces therefrom which are not ejected by the tilting thereof; a fluid operable detector having a port variable by movements of said beam for creating a variable pressure; an electric switch responsive to said variable pressure; first electrical means energizable for urging said beam toward a neutral position; second electrical means energizable for actuating said feeding mechanism; third electrical means energizable for tilting said platform; means responsive to the actuation of said switch to determine the energization of said third electrical means; and a cycle switch operable to control the periods of energization of said first and second electrical means and the period of effectiveness of said switch on said third electrical means.

4. In an automatic weighing and sorting machine; a scale beam; a platform on said beam tiltable to eject work pieces therefrom; a feeding mechanism operable to supply work to said platform and to eject work pieces therefrom which are not ejected by the tilting thereof; a fluid operable detector having a port variable by movements of said beam for creating a variable pressure; an electric switch responsive to said variable pressure; first electrical means energizable for urging said beam toward a neutral position; second electrical means energizable for actuating said feeding mechanism; third electrical means energizable for tilting said platform; means responsive to the actuation of said switch to determine the energization of said third electrical means; and a cycle switch operable to energize said first electrical means to hold said beam in neutral, then to energize said second electrical means to feed the work piece to said platform, then to de-energize said first and second electrical means to permit the beam to come to a position of balance, and finally, again to energize said first electrical means to hold said beam and to make said switch effective to determine the tilting or non-tilting of said platform.

5. In an automatic weighing and sorting machine having a scale comprising a pivotally mounted beam, a magnetic locking device for arresting the pivotal movement of said beam, a fluid pressure operated switch, a pressure supply for said switch, and a control means operable by the movement of said beam to vary the pressure supply to said switch, a work support associated with said beam, means for moving said work support to a series of selected positions, a work actuating device for placing work on or removing work from said work support, power means for actuating said last mentioned power means and electric circuit mechanism interconnected between said switch and the means for arresting the movement of the scaling beam, the means for selectively positioning the work holder and the means for placing the work on or removing it from said work holder.

6. In a weighing and sorting mechanism, a pivotally mounted scale beam, a magnetic locking device for arresting movement of said scale beam, a work support movably mounted on said scale beam, means for moving said work support to a plurality of selected positions, means for moving a work piece on to said work support, electrically controlled actuating devices for said magnetic locking means, said work holder positioning means, and said work piece actuating member, an electric control circuit including a fluid pressure operated switch connected to all of said last mentioned devices, a source of fluid pressure for actuating said switch, and control means operable by the movement of said beam to predetermined positions to vary the supply of fluid pressure to said switch in accordance with the weight of the work piece presented on said work holder.

7. In a weighing and sorting device having pivotally mounted scale beam, a magnetic lock associated with said scale beam, a work support mounted on said scale beam, means for moving said work support to a plurality of selected positions, a work piece actuating mechanism for presenting work on said work support and for removing work therefrom when said work holder is in one of said selected positions and conveyor means associated with each of said positions of said work holder, electric control mechanism connected to said magnetic lock, said actuating device for positioning said work holder, and the work actuating device including an air bellows operated switch, a source of air pressure for operating said switch, and a variable control port interconnected between said source of air pressure and said bellows actuated valve operable by movement of said beam to control the operation of said switch in a predetermined sequential manner relative to the weight of a work piece presented on said work holder.

FREDERICK L. RUPLEY.

REFERENCES CITED

The following references are of record in the file of this patent:

UNITED STATES PATENTS

| Number | Name | Date |
|---|---|---|
| 1,619,729 | Howard | Mar. 1, 1927 |
| 1,738,634 | Bryant | Dec. 10, 1929 |
| 2,007,507 | Steiner | July 9, 1935 |
| 2,364,832 | Weckerly | Dec. 12, 1944 |
| 2,417,642 | Gilchrist | Mar. 18, 1947 |

FOREIGN PATENTS

| Number | Country | Date |
|---|---|---|
| 341,365 | Great Britain | Jan. 5, 1931 |